United States Patent
Kaiser et al.

[15] 3,684,812
[45] Aug. 15, 1972

[54] BENZOHETEROCYCLICALKYL DERIVATIVES OF 2,4,9-TRIAZASPIRO(5,5)UNDECAN-1,3,5-TRIONE

[72] Inventors: Carl Kaiser; Charles L. Zirkle, both of 1500 Spring Garden St., Philadelphia, Pa. 19101

[22] Filed: March 10, 1971

[21] Appl. No.: 123,089

Related U.S. Application Data

[62] Division of Ser. No. 771,320, Oct. 28, 1968, Pat. No. 3,629,267.

[52] U.S. Cl. ...................260/256.5 R, 260/256.4 C
[51] Int. Cl. ...........................................C07d 99/06
[58] Field of Search ..................260/256.5 R, 256.4 C

[56] References Cited

UNITED STATES PATENTS 3,629,267   12/1971   Kaiser et al. ........260/256.5 R

*Primary Examiner*—Alex Mazel
*Assistant Examiner*—R. J. Gallagher
*Attorney*—William H. Edgerton et al.

[57] ABSTRACT

Benzoheterocyclicalkyl derivatives of 2,4,9-triazaspiro[5,5]undecan-1,3,5-trione in which the benzoheterocyclic moiety is thianaphthemyl or benzofuranyl, optionally substituted by chloro, bromo, fluoro, methyl, methoxy or trifluoromethyl, have neuroleptic activity. The compounds are generally prepared from either the benzoheterocyclicalkyl halide by reaction with the appropriate amine or the benzoheterocyclic amine by condensation with a 5,5-bis($\beta$-haloethyl)barbituric acid.

7 Claims, No Drawings

BENZOHETEROCYCLICALKYL DERIVATIVES OF 2,4,9-TRIAZASPIRO(5,5)UNDECAN-1,3,5-TRIONE

This application is a division of application Ser. No. 771,320 filed on Oct. 28, 1968, now U.S. Pat. No. 3,629,267.

This invention relates to novel benzoheterocyclicalkyl derivatives of 4-(2-keto-1-benzimidazolinyl)-piperidine, 4-(2-keto-1-benzimidazolinyl)-1,2,3,6-tetrahydropyridine, 1-phenyl-1,3,8-triazaspiro[4,5]decan-4-one and 2,4,9-triazaspiro[5,5]undecan-1,3,5-trione. These compounds have useful pharmacodynamic activity and more specifically have neuroleptic activity as demonstrated in standard animal pharmacological test procedures. Exemplary of the activity of the compounds of this invention is the moderate to marked decreased motor activity, catelepsy, hypotonia and ptosis produced in rats upon oral administration of doses ranging from 1.0 to 50.0 mg/kg. At these doses no toxicity is observed.

The compounds of this invention are represented by the following general structural formula:

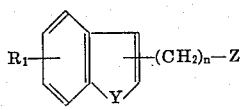

Formula I in which:

$R_1$ represents hydrogen, chloro, bromo, fluoro, methyl, methoxy or trifluoromethyl;

Y represents oxygen or sulfur;

$n$ represents a positive whole integer from 2 to 4; and

Z represents

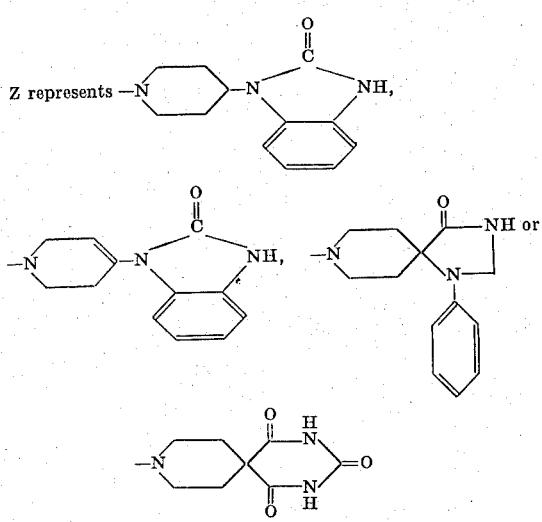

Preferred compounds include those of Formula I wherein $R_1$ is in the 5 or 6-position, Y is sulfur, $n$ is 3 and the benzoheterocyclic moiety is 3-substituted.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicyclic, methanesulfonic, ethanedisulfonic, acetic, oxalic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of this invention wherein Z is 4-(2-keto-1-benzimidazolinyl)-1-piperidyl, 4-(2-keto-1-benzimidazolinyl)-1,2,3,6-tetrahydro-1-pyridyl or 1-phenyl-1,3,8-triazaspiro[4,5]dec-8-yl-4-one are generally prepared from a benzoheterocyclicalkyl halide having the formula:

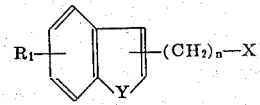

Formula II wherein $R_1$, Y and $n$ are as defined for Formula I and X is halogen, preferably chlorine or bromine, by reaction with the appropriate amine (HZ). The halides of Formula II are prepared from corresponding alkanoic acids ($n$ is 1 to 3) via reduction with lithium aluminum hydride to the alcohol followed by reaction with a phosphorus trihalide, such as phosphorus tribromide, to give the alkyl halide. The required alkanoic acids are obtained as described in Belgian Pat. No. 711,675.

The compounds of Formula I wherein Z is 2,4,9-triazaspiro[5,5]undec-9-yl-1,3,5-dione are generally prepared from a benzoheterocyclicalkyl amine having the formula:

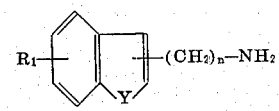

Formula III wherein $R_1$, Y and $n$ are as defined in Formula I by reaction with a 5,5-bis($\beta$-haloethyl)-barbituric acid derivative, the halo group being iodo or bromo. The amines of Formula III are prepared from corresponding alkanoic acids ($n$ is 1 to 3) via reacting the acid with thionyl chloride to give the acid chloride which is treated with ammonia and reducing the resulting amide with lithium aluminum hydride to yield the alkyl amine.

The compounds of this invention may be administered orally or parenterally in conventional dosage unit forms such as tablets, capsules, injectables or the like, by incorporating the appropriate dose of a compound of Formula I, either as the free base or an acid addition salt thereof, with carriers according to accepted pharmaceutical practices.

The foregoing is a general description of how to prepare the compounds of this invention. The following examples illustrate the preparation of specific compounds having neuroleptic activity. However this should not be construed as limiting the scope of the invention since appropriate variations in the starting materials will produce other products set forth hereinabove.

PREPARATIONS

A. 3-(3-Thianaphthenyl)-propyl bromide (Formula II)

To a mixture of 4.0 g. (0.105 m.) of lithium aluminum hydride in 1,000 ml. of dry ether is added a solution of 10.7 g. (0.052 m.) of 3-(3-thianaphthenyl)-propionic acid in 50 ml. of dry tetrahydrofuran, dropwise with stirring. The resulting mixture is stirred and refluxed for 4 hours, decomposed and filtered. The dried filtrate is evaporated in vacuo and the residue distilled to give 3-(3-thianaphthenyl)-propanol, b.p. 133°–158° C./0.5 mm.

A solution of 9.2 g. (0.0479 m.) of 3-(3-thianaphthenyl)-propanol in 250 ml. of dry ether is stirred while 10 ml. of phosphorus tribromide in 50 ml. of dry ether is added dropwise. The resulting mixture is stirred and refluxed for one hour, poured into ice-water and the layers separated. The ether layer is washed, dried and evaporated in vacuo to give an oil which is distilled to give 3-(3-thianaphthenyl)-propyl bromide, b.p. 147°–190° C./0.1 mm.

B. 3-(3-Thianaphthenyl)-propyl amine (Formula III)

A mixture of 5.2 g. (0.025 m.) of 3-(3-thianaphthenyl)-propionic acid and 15 ml. (0.025 m.) of thionyl chloride is allowed to stand at room temperature overnight, diluted with benzene and evaporated in vacuo to give the acid chloride. The latter is dissolved in ether and treated with an excess of aqueous ammonia. The resulting mixture is refluxed for 1 hour and the separated organic layer is washed, dried and concentrated to give 3-(3-thianaphthenyl)-propionamide. The amide is reduced with an equimolar amount of lithium aluminum hydride in dry ether to yield 3-(3-thianaphthenyl)-propylamine.

Following the procedures of parts A or B above, other $R_1$-substituted thianaphthene-or benzofuranalkanoic acids are similarly converted to corresponding alkyl bromides or amines.

EXAMPLE 1

A mixture of 4.7 g. (0.0219 m.) of 4-(2-keto-1-benzimidazolinyl)-1,2,3,6-tetrahydropyridine, 8.0 g. (0.0314 m.) of 3-(3-thianaphthenyl)-propyl bromide, 1.84 g. (0.0219 m.) of sodium bicarbonate and 0.3 g. of potassium iodide in 500 ml. of dry toluene is stirred and refluxed for 4 days. The reaction mixture is evaporated in vacuo and the residue is dissolved in chloroform/water. The water layer is washed with chloroform and the total chloroform solution is washed with dilute hydrochloric acid, dried and evaporated in vacuo to give 1-[3-(3-thianaphthenyl)-propyl]-4-(2-keto-1-benzimidazolinyl)-1,2,3,6-tetrahydropyridine; hydrochloride m.p. 252°–254° C.

Similarly, by employing 3-(5-chloro-2-thianaphthenyl)-propyl bromide (obtained from the propionic acid) in the above reaction there is produced 1-[3-(5-chloro-2-thianaphthenyl)-propyl]-4-(2-keto-1-benzimidazolinyl)-1,2,3,6-tetrahydropyridine.

EXAMPLE 2

A mixture of 8.0 g. (0.0314 m.) of 3-(3-thianaphthenyl)-propyl bromide, 4.4 g. (0.0203 m.) of 4-(2-keto-1-benzimidazolinyl)-piperidine, 1.71 g. (0.0203 m.) of sodium bicarbonate and 0.3 g. of potassium iodide in 500 ml. of dry toluene is stirred and refluxed for four days. The reaction mixture is evaporated in vacuo and the residue dissolved in chloroform/water. The layers are separated and further worked up as in Example 1 to yield 1-[3-(3-thianapthenyl)-propyl]-4-(2-keto-1-benzimidazolinyl)-piperidine; hydrochloride m.p. 287°–294° C.

Similarly, by employing an equivalent amount of 3-(5-methyl-3-thianaphthenyl)-propyl bromide (obtained from the propionic acid) as described above there is prepared 1-[3-(5-methyl-3-thianaphthenyl)-propyl]-4-(2-keto-1-benzimidazolinyl)-piperidine.

EXAMPLE 3

Following the procedures of Example 1, a mixture of 5.0 g. (0.0216 m.) of 1-phenyl-1,3,8-triazaspiro[4,5]decan-4-one, 8.0 g. (0.0314 m.) of 3-(3-thianaphthenyl)-propyl bromide, 1.82 g. (0.0216 m.) of sodium bicarbonate and 0.3 g. of potassium iodide in 500 ml. of dry toluene is stirred and refluxed for four days, then filtered while hot. The filtrate is evaporated in vacuo and the residue worked up to give 1-phenyl-8-[3-(3-thianaphthenyl)-propyl]-1,3,8-triazaspiro[4,5]decan-4-one; hydrochloride m.p. 258°–260° C.

Use of 3-(6-methoxy-2-thianaphthenyl)-propyl bromide (obtained from the propionic acid) as the reactant above yields 1-phenyl-8-[3-(6-methoxy-2-thianaphthenyl)-propyl]-1,3,8-triazaspiro[4,5]decan-4-one.

EXAMPLE 4

A solution of 6.0 g. (0.03 m.) of 3-(3-thianaphthenyl)-propylamine in 60 ml. of anhydrous ethanol is added to a suspension of 11.7 g. (0.027 m.) of 5,5-bis($\beta$-iodoethyl)barbituric acid in 80 ml. of anhydrous ethanol and the mixture is shaken 2½ hours in the dark under nitrogen. One equivalent of dry silver oxide and, after shaking for 3 days, one more equivalent of silver oxide is added. The mixture is then shaken for 3 hours, briefly heated to 60° C., filtered and evaporated. The residue is purified by chromatography to give 9-[3-(3-thianaphthenyl)-propyl]-2,4,9-triazaspiro(5,5)undecan-1,3,5-trione.

Similarly, by reacting 3-(3-benzofuranyl)-propylamine (obtained from the propionic acid) with 5,5-bis($\beta$-iodoethyl)barbituric acid as described above there is prepared 9-[3-(3-benzofuranyl)-propyl]-2,4,9-triazaspiro[5,5]dundecan-1,3,5-trione.

EXAMPLE 5

Following the procedure of Example 1, an equivalent amount of 3-(2-benzofuranyl)-propyl bromide (obtained from the propionic acid) is reacted with 4-(2-keto-1-benzimidazolinyl)-1,2,3,6-tetrahydropyridine in the presence of sodium bicarbonate and potassium iodide to yield upon workup 1-[3-(2-benzofuranyl)-propyl]-4-(2-keto-1-benzimidazolinyl)-1,2,3,6-tetrahydropyridine.

By employing instead 3-(3-benzofuranyl)-propyl bromide as the reactant above there is obtained 1-[3-(3-benzofuranyl)-propyl]-4-(2-keto-1-benzimidazolinyl)-1,2,3,6-tetrahydropyridine.

EXAMPLE 6

Following the procedure of Example 1, 3-(6-fluoro-3-thianaphthenyl)-propyl bromide (obtained from the propionic acid) is reacted with 4-(2-keto-1-benzimidazolinyl)-1,2,3,6-tetrahydropyridine to give 1-[3-(6-fluoro-3-thianaphthenyl)-propyl]-4-(2-keto-1-benzimidazolinyl)-1,2,3,6-tetrahydropyridine.

Use of 3-(6-trifluoromethyl-3-thianaphthenyl)-propyl bromide as described above yields 1-[3-(6-trifluoromethyl-3-thianaphthenyl)-propyl]-4-(2-keto-1-benzimidazolinyl)-1,2,3,6-tetrahydropyridine.

EXAMPLE 7

Following the procedure of Example 1, 3-(6-bromo-3-benzofuranyl)-propyl bromide (obtained from the propionic acid) is reacted with 4-(2-keto-1- benzimidazolinyl)-1,2,3,6-tetrahydropyridine to yield the product 1-[3-(6-bromo-3-benzofuranyl)-propyl]-4-(2-keto-1-benzimidazolinyl)-1,2,3,6-tetrahydropyridine.

EXAMPLE 8

Following the procedures of Examples 1 and 3, a mixture of 2-(3-thianaphthenyl)-ethyl bromide (obtained from the acetic acid) and 1-phenyl-1,3,8-triazaspiro[4,5]decan-4-one is stirred and refluxed for four days in the presence of sodium bicarbonate and potassium iodide to yield upon workup the product, 1-phenyl-8-[2-(3-thianaphthenyl)-ethyl]-1,3,8-triazaspiro[4,5]decan-4-one.

Similarly, employing 4-(6-methoxy-3-benzofuranyl)-butyl bromide (obtained from the butyric acid) as described above results in the formation of 1-phenyl-8-[4-(6-methoxy-3-benzofuranyl)-butyl]-1,3,8-triazaspiro[4,5]decan-4-one.

What is claimed is:

1. A chemical compound of the formula:

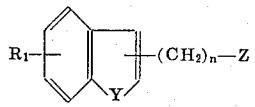

or a pharmaceutically acceptable acid addition salt thereof, wherein:

$R_1$ is hydrogen, chloro, bromo, fluoro, methyl, methoxy or trifluoromethyl;

Y is oxygen or sulfur;

$n$ is a whole integer from 2 to 4; and

Z is

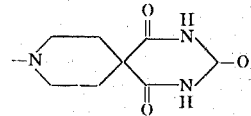

2. A chemical compound according to claim 1 in which the benzoheterocyclic moiety is 3-substituted and has the $R_1$ substituent in the 5 or 6-position.

3. A chemical compound according to claim 2 in which Y is sulfur and $n$ is 3.

4. A chemical compound according to claim 3 in which $R_1$ is hydrogen, chloro or fluoro.

5. A chemical compound according to claim 4 in which $R_1$ is hydrogen, being the compound 9-[3-(3-thianaphthenyl)-propyl]-2,4,9-triazaspiro[5,5]1,3,5-trione.

6. A chemical compound according to claim 4 in which $R_1$ is fluoro.

7. A chemical compound according to claim 4 in which $R_1$ is chloro.

* * * * *

PO-1050
(5/69)

UNITED STATES PATENT OFFICE
CERTIFICATE OF CORRECTION

Patent No. 3,684,812    Dated September 18, 1972

Inventor(s) Carl Kaiser and Charles L. Zirkle

It is certified that error appears in the above-identified patent and that said Letters Patent are hereby corrected as shown below:

On the face of the patent the assignee should be indicated as follows:

[73] Assignee: Smith Kline & French Laboratories, Philadelphia, Pa.

Column 6, lines 6-13, the partial structural formula should read as follows:

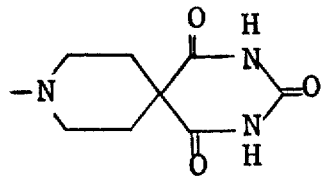

Signed and sealed this 17th day of April 1973.

(SEAL)
Attest:

EDWARD M. FLETCHER, JR.
Attesting Officer

ROBERT GOTTSCHALK
Commissioner of Patents